Figure 1:
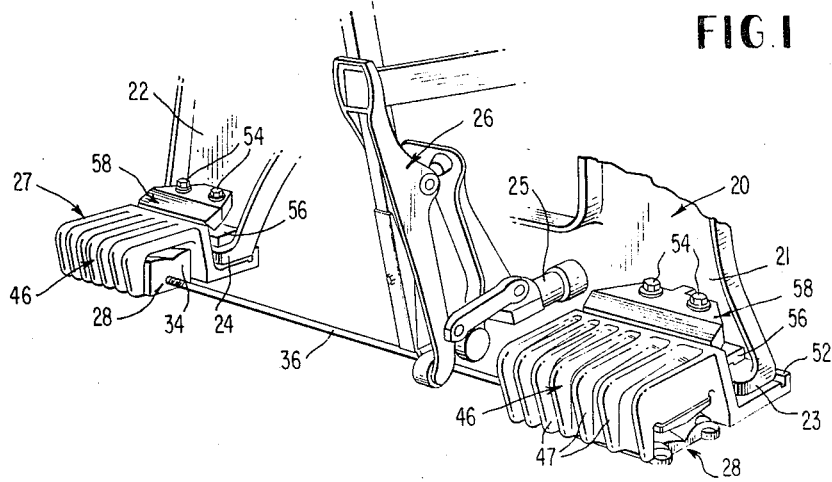

Nov. 1, 1966    W. ENGELS    3,282,543
VIBRATION ISOLATING SUPPORT FOR MACHINERY
Filed July 21, 1964    5 Sheets-Sheet 1

INVENTOR.
WALTER ENGELS
BY
B. P. Fishburn, Jr.
ATTORNEY

Nov. 1, 1966   W. ENGELS   3,282,543
VIBRATION ISOLATING SUPPORT FOR MACHINERY
Filed July 21, 1964   5 Sheets-Sheet 2

INVENTOR.
WALTER ENGELS
BY
B. P. Fishburne, Jr.
ATTORNEY

Nov. 1, 1966    W. ENGELS    3,282,543
VIBRATION ISOLATING SUPPORT FOR MACHINERY
Filed July 21, 1964    5 Sheets-Sheet 3

INVENTOR.
WALTER ENGELS
BY
B.P. Fishburne Jr.
ATTORNEY

Nov. 1, 1966 W. ENGELS 3,282,543
VIBRATION ISOLATING SUPPORT FOR MACHINERY
Filed July 21, 1964 5 Sheets-Sheet 4
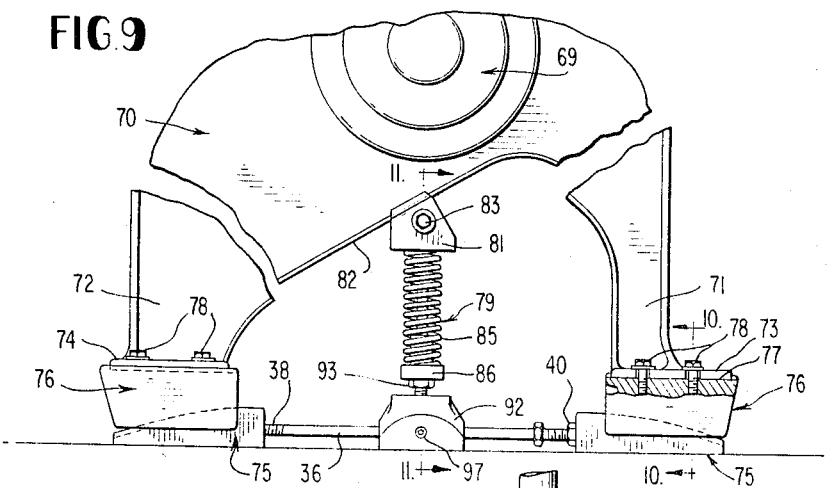
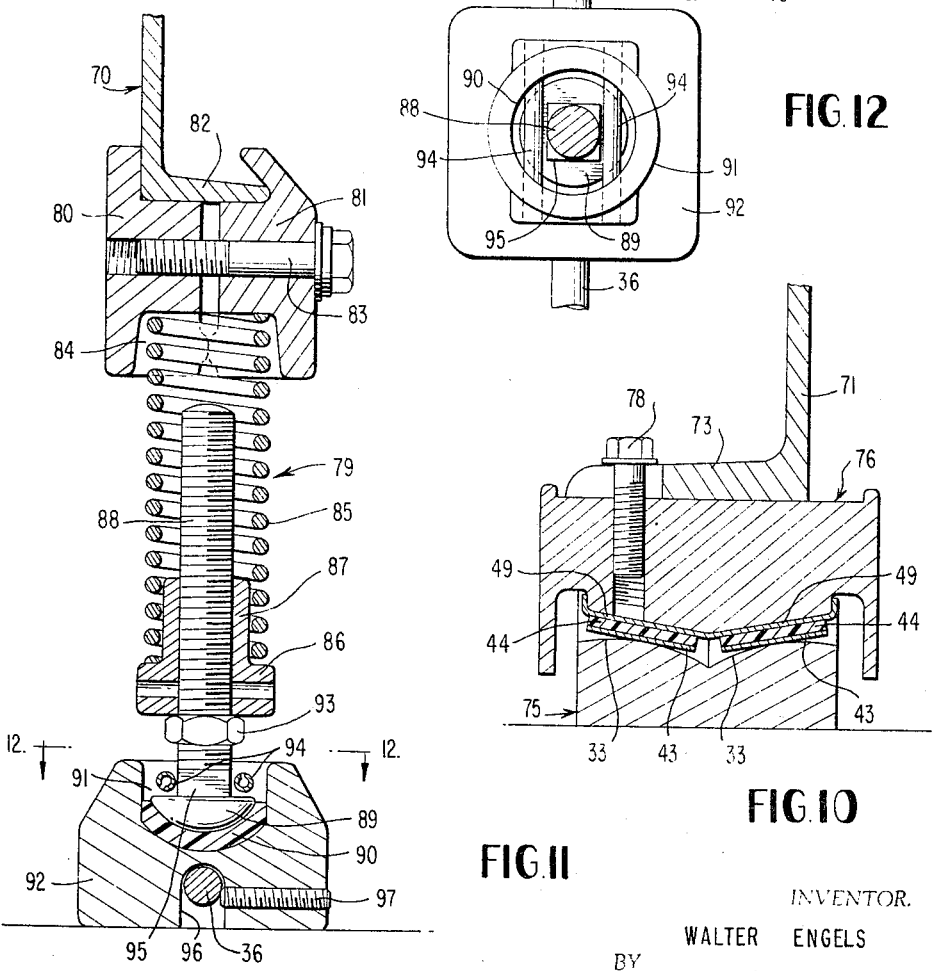
INVENTOR.
WALTER ENGELS
BY
B. P. Fishburn, Jr.
ATTORNEY D = DISTANCE OF CENTER POINTS FOR BEARING CURVATURE
R = RADIUS OF BEARING CURVATURE
L = LENGTH OF BEARING PLATE = 6"
$\alpha$ = MEAN ANGLE OF BEARING INCLINE

INVENTOR.
WALTER ENGELS
BY
ATTORNEY

United States Patent Office 3,282,543
Patented Nov. 1, 1966

3,282,543
VIBRATION ISOLATING SUPPORT FOR MACHINERY
Walter Engels, Tryon, N.C., assignor to H & S Co., Inc., Greenville County, S.C., a corporation of South Carolina
Filed July 21, 1964, Ser. No. 384,087
18 Claims. (Cl. 248—22)

This invention relates broadly to machinery supports and more particularly to a vibration isolating support for textile machines particularly looms.

This application contains subject matter in common with prior copending application Serial Number 196,159, filed May 21, 1962, for Loom Anti-Vibration Mounting Means, Harry R. Kennedy et al., now Patent No. 3,160,376.

Heavy vibration forces generated by loom operation present a serious problem to textile mills and may actually endanger building structures and floor structures to the extent that many textile mills cannot operate modern looms, or are compelled to operate them at lower than optimum speeds. There is also evidence that the forces and stresses caused by vibration have an adverse effect on looms themselves, leading to fatigue and failure of certain parts, thus increasing maintenance costs.

Accordingly, it is the general and principal object of the invention to provide a vibration isolating base or support for looms which will to a great extent overcome the above difficulties, and also have a beneficial effect on loom operation.

Another important object of the invention is to provide a vibration isolating support for looms which is substantially self-leveling under the influence of gravity and which need not be bolted or otherwise rigidly secured to the floor.

Another very important object is to provide a device of the mentioned character which does not appreciably increase the height of the loom which is a fairly critical factor particularly in modern looms.

A further object of the invention is to provide a vibration isolator for looms which enables the entire loom to have limited movement in a direction parallel to resultant force vectors induced on the loom by vibration.

Still another object is to provide supporting means for looms which does not require conventional lubrication and which includes means to conduct away heat generated by friction.

Another important object is to provide a vibration isolating support for looms including individually adjustable base members which enable the invention to accommodate looms having various spacings between their feet and also allowing some regulation of loom displacement amplitude, and for equalizing the extent of movement of both loom sides.

Another object is to provide a loom support including bearing surfaces which are non-corrosive in the presence of the high humidity encountered in weaving rooms.

Still another object is to provide a vibration isolating loom support having individual curved bearing parts whose spacing and degrees of curvature are carefully chosen in light of both static and dynamic loading on the bearing surfaces.

Other objects and advantages of the invention will be apparent during the course of the following description.

Figure 4:
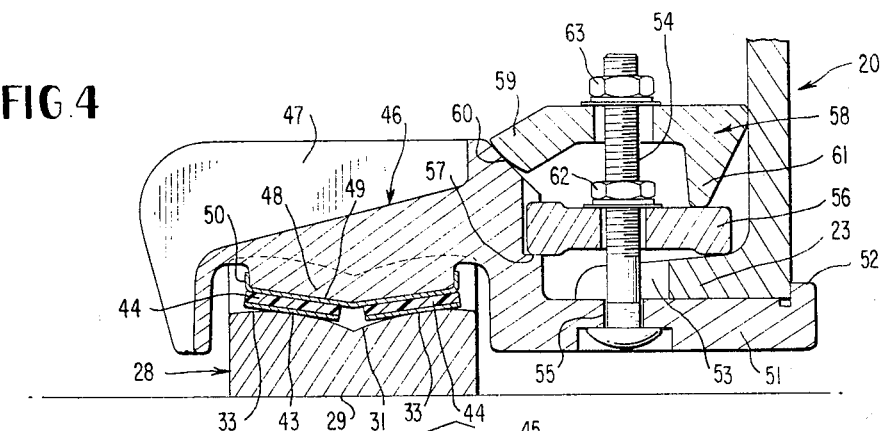
Figure 5:
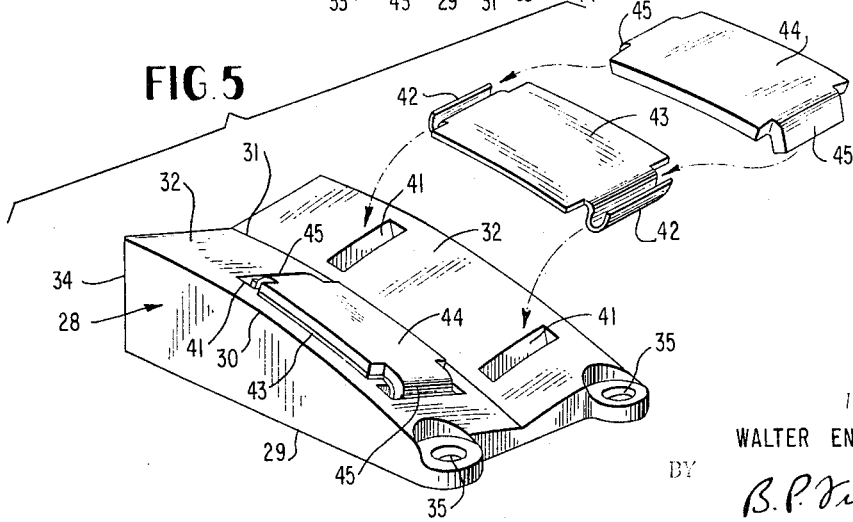
Figure 2:
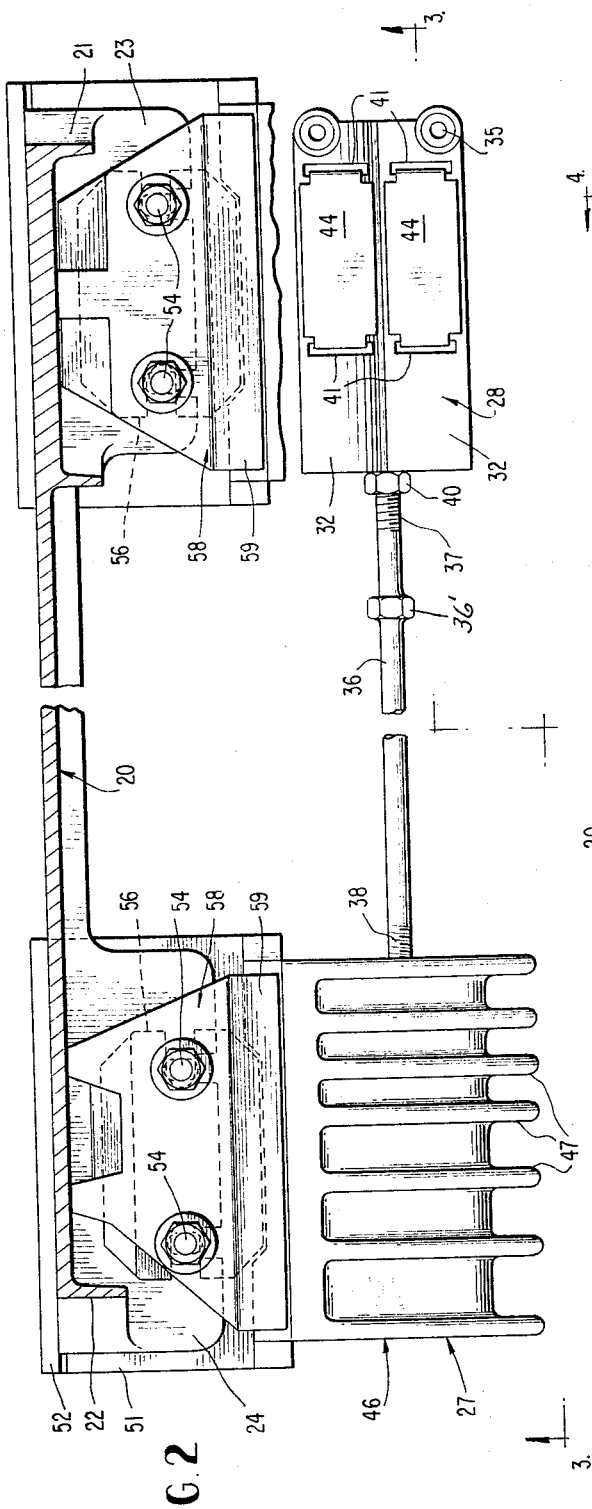
Figure 3:
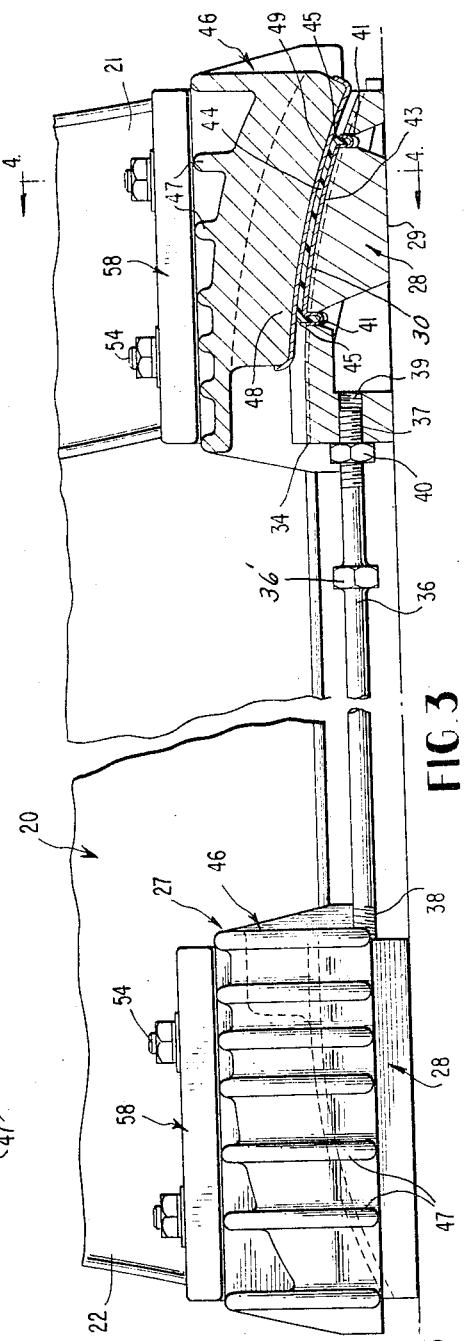
Figure 6:
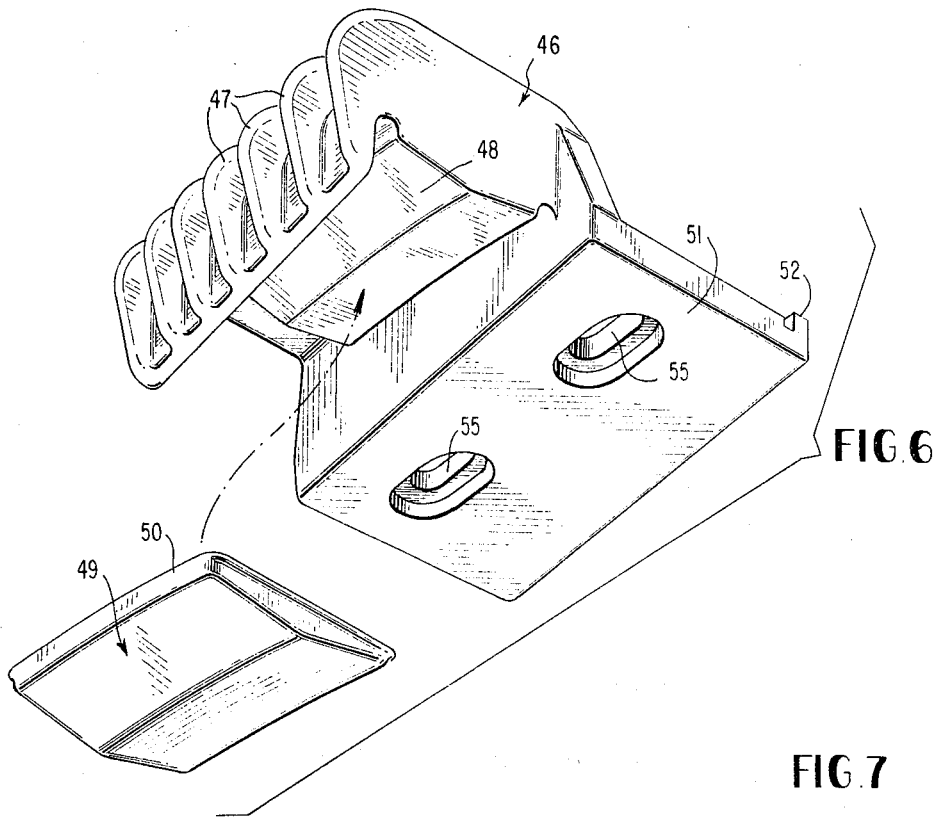
Figure 7:
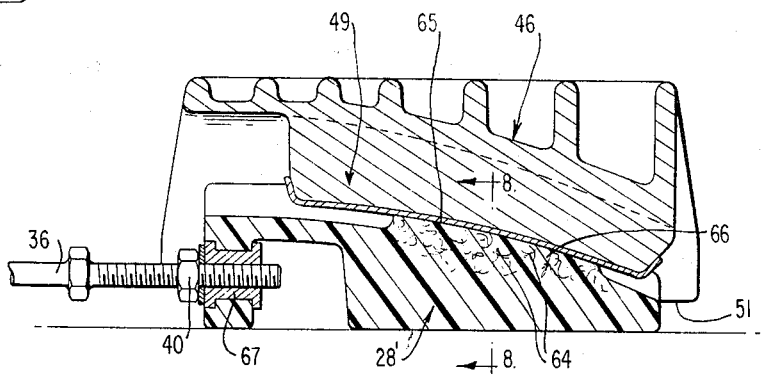
Figure 8:
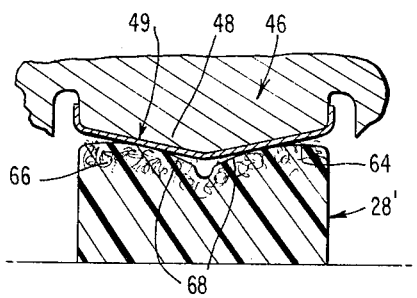
Figure 13:
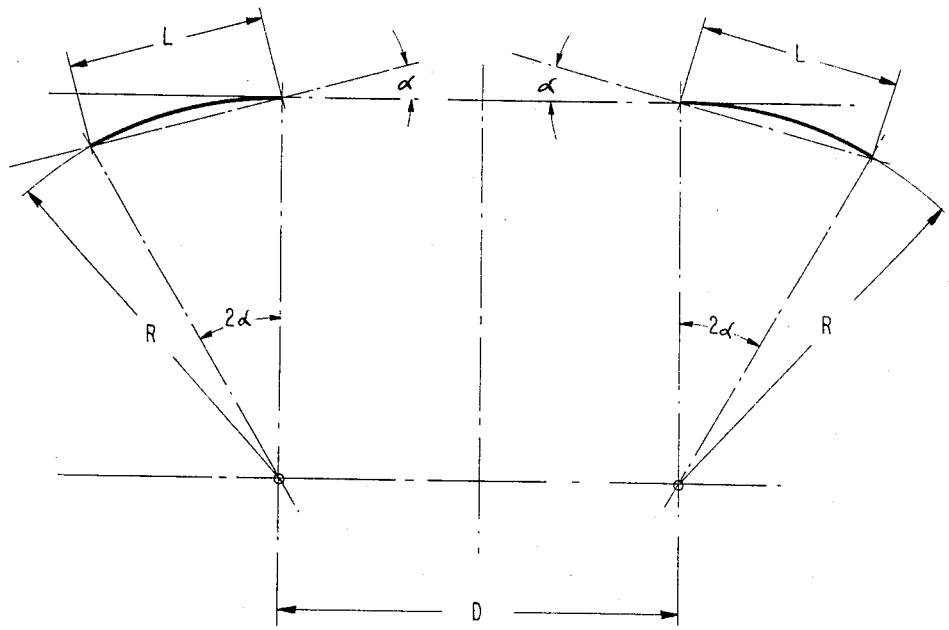

In the accompanying drawings forming a part of this application and in which like numerals are employed to designate like parts throughout the same, FIGURE 1 is a fragmentary perspective view of a loom equipped with the vibration isolating support or base embodying the invention in accordance with one preferred form thereof, FIGURE 2 is a fragmentary plan view of the invention in FIGURE 1 on an enlarged scale with parts in section and parts broken away for clarity of illustration, FIGURE 3 is a longitudinal vertical section taken on line 3—3 of FIGURE 2, FIGURE 4 is an enlarged transverse vertical section taken on line 4—4 of FIGURE 3, FIGURE 5 is an exploded perspective view of a base member and associated components, FIGURE 6 is an exploded perspective view of a slide or runner and associated insert, FIGURE 7 is a fragmentary longitudinal cross section similar to FIGURE 3 showing a modification of the invention, FIGURE 8 is a fragmentary vertical section taken on line 8—8 of FIGURE 7, FIGURE 9 is a fragmentary side elevation somewhat similar to FIGURE 1 showing a further modification of the invention, FIGURE 10 is an enlarged fragmentary vertical section taken on line 10—10 of FIGURE 9, FIGURE 11 is an enlarged vertical section taken on line 11—11 of FIGURE 9, FIGURE 12 is a horizontal section taken on line 12—12 of FIGURE 11, and FIGURE 13 is a bearing curvature diagram illustrating an important aspect of the invention.

In the drawings, wherein for the purpose of illustration are shown preferred embodiments of the invention, attention is directed first to FIGURES 1–6 inclusive, wherein the numeral 20 designates one frame end of a conventional weaving loom having a substantially identical upright frame end, not shown, at the opposite end thereof. Each frame end 20 has forward and rear leg portions 21 and 22 having integral horizontal feet 23 and 24 which conventionally rest directly upon the floor of the weaving room and may be bolted to the floor with or without an intervening cushion of felt or the like. Toward its forward or cloth take-up end and near its bottom, the loom has a horizontal rocker shaft 25 spanning its entire width and carrying the usual shuttle picking means 26 outwardly of the frame ends 20. The lay of the loom, not shown, all parts associated with the lay, and the upstanding lay swords, are also supported upon the rocker shaft 25 and oscillate therewith on the axis of the shaft 25 during loom operation. The lay and associated mechanism causes a rather heavy mass to be concentrated near the top of the loom, and during loom operation, this mass swings back and forth at a rapid and steady rate as is well known. There are other factors of vibration caused by the movement of loom parts in different directions but the dominant mass inducing heavy resultant vibration in the loom in the neighborhood of two hundred cycles per minute is the front-to-back oscillating mass on and above the rocker shaft 25. The movement of this mass and the inertia forces generated impart to the loom a characteristic resultant forced vibration pattern which is generally from front-to-back, but includes also a vertical or whipping component, due to the location of the lay mass well above the elevation of the rocker shaft 25 and the loom center of gravity.

The particular curved bearing means of the invention are subjected to both static loading and dynamic effects or loads during operation. The latter type of loading is a result of the inertia forces produced by the moving lay mass. This dynamic bearing loading is a fluctuating factor that constantly changes in magnitude from a minimum value to a maximum value and back to a minimum during one weaving cycle. It may be observed that when the loom moves forwardly on the support means of the invention, the load is higher than mean on the front bearings and lower than mean on the back bearings.

During this forward motion of the loom, and with particular reference to the loom center of gravity, the angle of inclination of the bearing with the higher load than mean becomes progressively less, while the angle of inclination of the bearing with the lower than mean load becomes progressively more. The same is true during backward motion of the loom upon its bearing. The load is higher than mean on the back bearings and lower than mean on the front bearings during backward movement. During backward movement of the loom, the angle of inclination of the bearings with the higher load than mean becomes progressively less while the angle of inclination of the bearings having the lower load than mean, and with relation to the loom center of gravity, becomes progressively more. It must be kept in mind in order to fully understand the merits of the loom mounting that there are both static and dynamic loads on the curved bearing surfaces, both of which loads have horizontal and vertical vectors.

Referring to diagrammatic FIGURE 13 of the drawings, the bearing curvatures arcs or surfaces are shown by the two solid lines. It is important to note that the inner terminals of these arcs start from points on a horizontal plane and are spaced apart a distance D, which is an adjustable distance in practice. Each of the arcs slope downwardly from the horizontal because the horizontal force component of a vertical load on a horizontal surface is zero. It may be observed in FIGURE 13, therefore, that the loom oscillates on arcuate bearing surfaces which have separate and distinct radii, although equal radii, spaced apart a definite distance D for a given installation. This is quite different from the situation where the loom or other machinery could be allowed to oscillate on a single arcuate bearing surface having one radius. With the arrangement shown in FIGURE 13, there is an automatic retarding or braking effect on the loom as it oscillates because of the spacing of the radii R. That is to say, when the loom moves toward its front or back, the trailing curved bearing surface produces a dragging action which would not occur if the bearing surfaces had a single common radius without the distance D between them.

In the FIGURE 13 diagram the length L of the bearing plate to be described is a design parameter fixed and determined by the specific bearing load (p.s.i.) of the steel-plastic bearing materials employed and which these materials can stand without failure. In one practical embodiment, the length L is six inches and is constant.

The angle alpha is an experimental parameter which varies with the ratio of (static) loom weight and (dynamic) inertia forces. Related mathematical calculations are highly complicated and are omitted herein. The angle alpha in practice is in the range of 8 degrees to 15 degrees. Therefore, if L is fixed, the bearing curve must start from the horizontal, the angle alpha is variable, the radius R is a direct function of alpha, and must change with alpha. The distance D bears no relationship to alpha, R, and L. It is solely determined by the mounting possibilities on existing loom structures. In any event, the distance D will always be included between the centers from which the two radii are struck.

With continued reference to FIGURES 1 through 6 of the drawings, the invention embodies a pair of substantially identical units, only one of which is shown in the drawings for the sake of simplicity and indicated generally by the numeral 27. This unit 27 supports the loom frame end 20 in a manner to be described presently, and it should be borne in mind that a substantially identical invention unit coacts with and supports the remote frame end of the loom, not shown.

The unit 27 comprises front and back identical base or weight bearing members 28 formed of cast iron or the like and each having a low silhouette and a flat bottom face 29 to engage the floor directly. Each base member 28 is generally rectangular as viewed from its top or bottom and each tapers longitudinally toward its outer end facing the front or back of the loom during use, FIGURE 3.

The top face of each base member 28 in addition to being inclined has a definite degree of curvature longitudinally as indicated at 30 in FIGURES 3 and 5. Corresponding to the diagram of FIGURE 13, previously discussed, the circularly curved portions of the base members 28 have their upper terminals on a common horizontal plane and extend downwardly therefrom. That is to say, the upper extremities of the curved areas or portions 30 of base members 28 are not on an incline but begin at the true horizontal and all other points on the curved portions 30 are below the horizontal. The arrangement of these curved surface portions is important in the invention and establishes the basic oscillation path through which the entire loom moves while in operation.

Additionally, the top surface of each base member 28 is recessed throughout its entire length to provide a shallow generally V-shaped configuration indicated at 31, FIGURES 4 and 5, and the opposite face portions 32 on each member 28 are also rounded transversely on gentle arcs indicated at 33. The innermost vertical end face 34 of each base member 28 is square with the bottom face 29, as shown. It may therefore be said concerning each base member 28 that the same is a low silhouette rigid block-line body having a level bottom face and a longitudinally inclined arcuate top face whose curvature begins at the horizontal and extends downwardly from the horizontal toward the outer end of the base member.

Each base member 28 may be adapted, as shown at 35, to be bolted to the weaving room floor, if desired. However, such anchoring of the base members 28 is not at all essential and is preferably omitted in practice. It has been found that the invention operates so smoothly and efficiently in conjunction with the loom that no rigid attachment to the floor whatsover is necessary or even desirable in most cases.

The base members 28 of the complete unit 27 are adjustably connected by a tie rod 36 having a polygonal enlargement 36' to facilitate turning and having its opposite end portion screw-threaded with right and left hand screw threads respectively as shown at 37 and 38, for engagement within correspondingly screw-threaded openings 39 formed in the inner ends of base members 28. The adjusting tie rod 36 is arranged close to the floor, as indicated. It is provided on one screw-threaded end portion with a suitable lock nut 40 which may be drawn up tightly against the adjacent base member 28 after proper adjustment has been made. Quite obviously, by turning the right and left hand screw-threaded tie rod 36, the two base members 28 are adjusted toward or from each other to properly accommodate the spacing of the front and rear loom feet 23 and 24, which spacing may vary in some installations. An even more important reason for this adjustability feature of the invention is that the actual displacement amplitude caused by vibration can be changed or influenced somewhat by spreading apart or drawing together the base members 28. This adjustment also allows for equalization of movement on both sides of the loom in the event that one loom side tends to move more than the other side.

Each base member 28 is provided in its upper face portions 32 with pairs of spaced slots 41. The slots on each face portion 32 are transversely aligned with those on the opposite face portion 32. One pair of the slots 41 is arranged near and inwardly of the lowermost or outer end of each member 28, whereas the other pair of slots 41 is spaced a considerable distance upwardly and inwardly and substantially at the point where the arcuate surface portion 30 blends into the horizontal.

The slots 41 of each surface portion 32 receive snugly yet removably therein U-shaped resilient extensions 42 of spring back-up plates 43 for correspondingly shaped self-lubricating bearing pads 44 formed of TFE-fluor carbon resin (Teflon) or the like. The back-up plates 43 formed of spring steel or the like reinforce the Teflon pads 44 which has excellent self-lubricating properties but are relatively weak structurally. Each pad 44 has down turned end lugs 45 adapted to snap inside of the U-shaped extensions 42 in assembly. The plates 43 and bearing pads 44 are curved longitudinally on the same radius R shown in FIGURE 13 and shown at 30 in the other figures of the drawings, whereby these elements 43 and 44 conform to the curvature of the face portions 32 in the longitudinal direction. As shown in FIGURE 4, the elements 43 and 44 are transversely flat and they may have limited rocking engagement upon the arcuate faces indicated at 33 transversely of the base members 28. This construction renders the bearing pads 44 somewhat free floating and adjusting under load relative to the base members 28 upon which they are seated. Additionally, the longitudinal curvature of the back-up plates 43 is preferably of a slightly greater degree than the longitudinal curvature indicated at 30, so that under no load the plates 43 and also the bearing pads will be bowed upwardly slightly relative to the face portions 32. However, under load, FIGURE 3, the elements 44 and 43 will conform to the longitudinal curvature of the base member 28. The described arrangement also renders it a simple matter to replace the self-lubricating bearing pads 44 after wear or damage. The pads 44 and back-up plates 43 are both relatively thin elements, as shown, and add very little height to the low silhouette base members 28, it being a main objective of the invention to increase the height of the loom by the smallest possible amount. In fact, the invention elevates the loom only about one inch which is unobjectionable. The elements 43 and 44 are generally rectangular and extend over major surface portions of the base members 28, as shown.

Coacting with the relatively stationary base members 28 and their self-adjusting readily replaceable bearing pads 44 are overlying runners 46 formed of cast iron or the like and being purposely heavy in cross section for the sake of rigidity and strength and also to facilitate the dissipation of heat caused by friction through a "heat sink" action. The tops and outer sides of the runners 46 carry a plurality of heat radiating fins 47, cast integral therewith to encourage the above action.

Each runner 46 is provided on its underside with a contoured pad or boss 48 having the same longitudinal curvature and inclination as the underlying elements 44, 43 and 28, see FIGURE 3. As shown in FIGURE 4, the boss 48 may be somewhat narrower than the base member 28 and also somewhat shorter than the base member, FIGURE 3. However, the boss 48 is longer than the bearing pad 44 to allow for a full range of movement when the loom oscillates or vibrates under the forces induced therein. The inclined boss 48 has its upper extremity or curvature beginning at the horizontal and extending downwardly in an arcuate path to conform to the arrangement shown in the diagram, FIGURE 13. With reference to FIGURE 4, the pad 48 has a shallow V-shape in transverse cross section and is not curved transversely but is flat faced, thus differing from the curvature of base member 28 at 33. The pad 48, however, spans the major portion of the width of the underlying base member 28, FIGURE 4.

A readily removable thin-walled stainless steel or like material slide plate or insert 49 is adapted to be removably snapped over the contoured boss 48 as clearly shown in the drawings and the marginal wall 50 of slide plate 49 frictionally engages the boss 48. The slide plate 49 is longitudinally curved and otherwise contoured fit the boss 48 and to conform to the longitudinal curvature of the underlying bearing pads 44 and to conform to the transversely straight configuration of the pads 44 as shown in FIGURE 4. The smooth surfaced stainless steel slide plates 49 thus intervene between the bosses 48 and the Teflon bearing pads 44 and the slide plates 49 directly slidably engage the self-lubricating Teflon pads and this provides excellent slide bearing arrangement which requires no lubrication and yet has minimum friction. Such heat as is developed by friction is conducted upwardly through the plate 49 to the body of the runner 46 which functions as a "heat sink." The heat is ultimately dissipated into the frame of the loom and away from the fins 47 by radiation. The stainless steel and Teflon bearing faces are also non-corrosive, which is important in the high humidity environment where the invention must operate.

Each runner 46 carries a downwardly offset inner side horizontal extension or flange 51 integral therewith and lying immediately inwardly of the base member 28 and spaced only slightly above the floor level. The extension or flange 51 underlies and directly supports the adjacent foot 23 or 24 of the loom, as clearly shown in FIGURE 4, and the flange 51 preferably has an upstanding alignment ledge 52 integral therewith to engage the loom foot and maintain the parts substantially parallel.

Each loom foot is conventionally slotted as at 53 to receive a pair of upstanding bolts 54 engaging through openings 55 in the extension 51. A first clamp dog or plate 56 engages over the bolts 54 and bears downwardly upon the loom foot 23, FIGURE 4, and is maintained level by a horizontal ledge 57 on the runner 46. Another and upper clamp dog 58 receives the bolts 54 and has an outer inclined flange 59 bearing upon a diagonal face 60 of the slide 46. A depending flange 61 of the upper clamp dog 58 bears upon the top of the lower clamp dog 56. Lower and upper jam nuts 62 and 63 and suitable washers are applied to the clamp bolts 54 immediately above the clamp dogs. Upon tightening, the upper dog 58 engages the adjacent frame end 20 near and above the foot 23, as shown in FIGURE 4. By virtue of this arrangement, an extremely secure and rigid connection between the runner 46 and the adjacent foot of the loom is established. The entire runner 46 and clamping means may be adjusted lengthwise of the loom foot before tightening. Once tightened, the runner 46 is rendered rigid with the loom foot and bears the weight of the loom and transmits this weight to the relatively stationary base or bearing members 28. If need be, in certain cases, additional bracing for the loom feet may be provided and this bracing, not shown, may be in the form of a diagonal brace extending from the flange 51 or an inward extension thereof to a horizontal bolster or beam rigidly connected between the frame ends near the bottoms thereof. It is believed that such bracing will not be required in most instances but may be employed if desired. This additional bracing in no way changes or effects the operation of the invention.

During loom operation, as previously mentioned, the main rocker shaft 25 oscillates on its horizontal axis and the entire picking mechanism 26 on both ends thereof oscillates and also the upstanding heavy lay swords, not shown, and the lay and all parts associated therewith oscillate back and forth in a rather long arc around the axis of rocker shaft 25 at a substantial distance above the same. Neglecting other relatively minor influencing factors, this major oscillating mass imparts to the entire loom a forced vibration pattern and frequency which is essentially back-and-forth horizontally but also includes a vertical or whipping component as discussed previously in connection with FIGURE 13.

The combined action of the curved oppositely inclined slide bearings, FIGURES 3 and 13, and the intervening self-lubricating or friction reducing means allows the entire loom to oscillate in a natural path and with a controlled amplitude taking into account both static and dynamic effects or forces. The supporting structure also renders the loom substantially self-centering or self-leveling by gravity. This is true in the direction of oscillation or longitudinally of the bearings and transversely also, because of the generally V-shaped recesses 31, etc. The main components of the invention have a wide range of adjustment as fully explained and provision is made for dissipating heat caused by friction and for easy replacement of parts which receive wear. The full advantages of the invention will be apparent to those skilled in the art without the necessity for further description of the embodiment shown in FIGURES 1–6.

FIGURES 7 and 8 show a modification of the invention wherein all parts previously described in FIGURES 1 through 6 remain identical in construction and function with the exception of the adjustable base members 28.

In FIGURES 7 and 8, each base member 28' is formed or molded from a suitable structurally strong plastic such as Delrin, an acetal plastic, synthetic rubber or other suitable moldable materials having structural characteristics and resistance to cold flowing greatly in excess of Teflon. Teflon, while ideal as a bearing material from the standpoint of low coefficient of friction, is structurally weak and has a considerable cold flow tendency. The molded unitary base member 28' is therefore formed of a structurally strong plastic or rubber-like material and the unitary molded base member may be substantially hard or rigid or may, if preferred, possess a certain degree of resiliency.

In order to provide the required low coefficient of friction and self-lubricating properties, Teflon fibers 64 in staple or flock form are dispersed through plastic or synthetic rubber base member 28' at the time of molding. These fibers constitute a filler material and are placed in irregular order in the structural plastic or synthetic rubber or the like forming the body of the member 28'. Some of the Teflon fibers or filaments project through the upper bearing face 65 of the member 28' and after a short period of relative movement between the face 65 and the previously-described stainless steel slide plate 49, Teflon particles become distributed over the opposed bearing faces and in effect cover the same with a very fine lubricating film. Obviously, the above arrangement depicted in FIGURES 7 and 8 eliminates the need for the separately formed Teflon bearing pads 44, their back-up plates 43 and the separately formed structural cast iron base members 28. The arrangement in FIGURES 7 and 8 is considerably more economical to manufacture and affords substantially the same advantages present in the prior form of the invention.

A contoured raised boss 66 is molded upon each base member 28' to impart to its upper face the same essential longitudinal and transverse configurations present in the prior form of the invention utilizing the elements 28, 43, 44, and 49.

The same right and left-hand screw-threaded adjusting and tie rod 36 is employed to interconnect a related pair of the base members 28' and maintain them structurally joined in all operative positions, just as in the first form of the invention. Suitable internally screw-threaded sleeves 67 are molded within the base members 28' as shown in FIGURE 7 to receive the ends of rod 36. The runner 46 and all other parts and their functions remain identical to the corresponding parts shown and described in the prior embodiment. In connection with FIGURE 8, the molded bearing faces 68 may be transversely crowned, as shown, or transversely flat, if preferred. The longitudinal curvature of the bearing face shown at 65 remains identical in both forms of the invention.

FIGURES 9 through 12 of the drawing illustrate another modification of the invention adapting the same to use on older type looms which are also somewhat lighter in weight. As will be described, the invention support in FIGURES 9 through 12 must be mounted directly under the loom feet rather than outboard thereof as in the prior forms of the invention. The reason for this is that in the older lighter weight looms, the foot construction of the loom frame is too weak to withstand bending stresses and therefore the invention support cannot be arranged outside of the loom foot as shown in FIGURE 1. The form of the invention in FIGURES 9–12 also increases the loom height somewhat more than in the prior preferred forms of the invention adaptable to modern heavy weight looms. However, this slight increase in height is not critical for older looms whose original height is less to begin with than the height of modern looms. In general, the invention as adapted to the older type looms serves the same purposes and functions generally in the same manner as above described in connection with the forms of the invention adapted to modern looms.

Another factor is involved in adapting the invention to older type lighter weight looms, namely, loom weight distribution which is more critical in light weight looms. In modern type looms, the location of the loom beam, the main motor and the like may be ignored because the overall weight of the loom is such that these individual components do not effect the center of gravity significantly. In the older looms, FIGURES 9–12, the main motor 69, shown diagrammatically in FIGURE 9, is mounted quite near one frame end 70 and is spaced quite remotely from the other frame end. This shifts the center of gravity toward the frame end 70 and places more weight on the legs 71 and 72 thereof and on the feet 73 and 74 than on the corresponding elements of the remote frame end. Consequently, the horizontal friction forces opposing the inertia or vibration forces are greater near the motor side of the loom. With this situation, when the loom lay and associated parts oscillate forwardly and rearwardly in an arc, the resultant inertia or vibration forces cause the loom to move back-and-forth somewhat unequally at its opposite sides. The vibration isolating means of the invention is not as effective on the motor side of the loom as on the opposite side and the adjustability of the invention as previously described is not always effective to equalize the situation. Accordingly, as will now be described in detail, means is provided to partially unload the motor side of the loom in the embodiment shown in FIGURES 9–12 so as to effectively equalize the distribution of weight on the loom feet and the invention components, thereby rendering the invention equally effective for both new and old types of looms.

With continued reference to FIGURES 9 through 12, the modified form of the invention shown comprises base members 75 which may be identical to the members 28 or 28'. The same adjusting or tie rod 36 previously described is employed. Somewhat modified runners 76 having flat top faces 77 are bolted directly at 78 to the bottoms of the loom feet and are arranged directly thereunder rather than in offset relation, as in FIGURE 4 for example. The identical stainless steel slide plates 49, Teflon bearing pads 44 and springs or back-up plates 43, previously described, may be used and are used unless it is desired to employ the molded wbase members 28' having the fibrous Teflon filler material. The runners 76 are quite substantial in cross section to serve as heat sinks for dissipating the heat of friction upwardly and away from the rubbing faces of the elements 44 and 49.

On the motor side of the loom and directly under the frame end 70 approximately midway between the legs thereof is an adjustable resilient unloading device 79. This device embodies a two-part clamp 80–81 which engages the lower flange 82 of frame end 70 and is secured thereto firmly by a screw 83. The two-part clamp has a socket 84 in its bottom receiving and stabilizing the upper end of a compressible coil spring 85 having its lower end resting on the shoulder 86 of a screw-threaded adjusting sleeve 87 used to regulate the tension of the spring. The sleeve 87 is mounted upon a screw-threaded bolt or rod 88 having a rounded head 89 at its lower end seated upon a correspondingly rounded disc of Teflon or the like indicated at 90, and contained within a recess 91 in a suitable base block 92 which engages the floor. A lock nut 93 is provided on the bolt 88 to lock the sleeve 87 in the selected adjusted position. A pair of roll pins 94 span the recess 91 on opposite sides of the square portion 95 of carriage bolt 88 to prevent the same from turning when the adjusting sleeve 87 is turned. A groove 96 in the bottom of base block 92 receives the tie rod 36 therethrough, and a set screw 97 may be employed to adjustably rigidly secure the block 92 to the tie rod 36.

The unloading device 79 may be adjusted through the medium of the sleeve 87 to lift or remove precisely the proper amount of weight from the adjacent loom feet 73 and 74 to substantially equalize the weight on the invention units at the opposite sides of the loom, as explained above. In other words, the adjustable unloading device 79 compensates or corrects for the weight imbalance caused mainly by the motor 69 in older type looms.

The mode of operation of the FIGURES 9-12 embodiment is basically the same as for the previously-described embodiment. The main vibration forces created by the oscillating lay assembly cause the entire loom to shift forwardly and rearwardly in a generally horizontal direction but with some tendency to toe downwardly alternately on the feet 73 and 74. The invention which includes the oppositely tapering and curved base members 75 and the coacting runners 76 with intervening low friction bearing pads allows the entire loom to follow its natural path and amplitude of vibration, under the influence of the oscillating lay mass which, as stated, is the chief influence establishing an overall vibration pattern for the loom.

Regarding all disclosed forms of the invention, the entire loom, while in operation, shifts smoothly and quietly back-and-forth on the generally horizontal although slightly arcuate path established by the opposed faces of the base members and the runners which are attached to the loom feet. The action of the invention is so smooth and frictionless that there is no necessity for bolting the base members 28 down to the floor as they do not tend to move. However, this may be done if desired merely to establish a fixed location for the installation in the weaving room.

With regard to the resilient unloading unit 79, the same is designed to offer negligible resistance to the vibratory generally horizontal movement of the loom. Toward this end, the rounded head 89 rocks freely upon the Teflon element 90.

It is believed that the full merits of the invention have now been established and will be readily appreciated by those skilled in the art.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:

1. A vibration isolating support for machinery comprising a pair of spaced base members adapted to rest directly on a floor and having upper bearing faces including longitudinally curved portions which slope in opposite directions downwardly from points which lie in a common horizontal plane, means adjustably interconnecting the base members and allowing their longitudinal spacing to be varied, a pair of complementally-shaped runner members overlying the base members and adapted for direct attachment to feet of said machinery for transmitting the weight of the machinery to the base members, and friction reducing means interposed between the opposed faces of the base and runner members.

2. The invention as defined by claim 1, and wherein the base members have their upper bearing faces recessed transversely and the lower faces of the runner members are crowned transversely to produce transverse cradling of the runner members upon the base members.

3. A vibration isolating support for looms comprising separately formed runner attachable to the supporting feet of a loom and having lower concave faces formed on individual arcs for extending longitudinally of the loom feet, said arcs having equal radii which are spaced apart, the upper terminals of the arcs lying on a horizontal plane common to said runners, separately formed base members for disposition beneath the runners and having flat bottom floor-engaging faces and upper convex faces formed on arcs for extending longitudinally of the loom feet and coinciding with the arcs of said runner concave faces, said runner concave faces and the convex faces of the base members interfitting, and relatively thin low friction bearing pad means intervening between said interfitting convex and concave faces, said bearing pad means including a prefabricated Teflon bearing pad detachably mounted upon each base member and an overlying stainless steel slide plate detachably mounted upon each runner, said Teflon pad and said slide plate conforming in curvature to said convex and concave faces respectively.

4. A loom supporting and vibration isolating unit comprising a pair of base members adapted to engage a floor near one loom frame end and tapering longitudinally in opposite directions longitudinally of the frame end and having upper faces which are curved on a path corresponding substantially to the major vibration path of said loom induced by lay motion, said upper faces of the base members having bearing portions formed at least in part of Teflon, means interconnecting the base members in end-to-end spaced relation with their lowermost ends facing outwardly longitudinally, runners overlying the base members and bearing portions and having lower faces which are contoured to substantially parallel said upper faecs of the base members, clamp means for detachably rigidly securing the runners to the forward and rear feet of said frame end, and smooth surfaced thin slide plates detachably mounted upon said lower faces of the runners and having direct sliding engagement with said bearing portions.

5. The invention as defined by claim 4, and wherein said bearing portions are separately formed Teflon bearing pads, and resilient metal back-up plates between said pads and said upper faces of the base members and having limited movable engagement with the base members and serving to strengthen said pads when the latter are under load.

6. A loom supporting and vibration isolating assembly attachable to one frame end of a loom for bodily carrying the frame end for oscillation in a path dictated largely by movement of the lay mass, said assembly comprising a pair of low silhouette base members adapted to rest directly on a floor immediately outwardly of the feet of said frame end, said base members having their top faces longitudinally curved on arcs whose radii are spaced apart and wherein the tops of said arcs terminate in a common horizontal plane, said base members sloping longitudinally in opposite directions, an adjusting tie rod including screw-threaded portions interconnecting said base members for limited longitudinal adjustment and holding the base members in selected adjusted positions, conforming low friction plastic bearing parts on said top faces of the base members, metallic heat dissipating separately formed runners overlying the base members and having bottom faces conforming substantially to the shape of said top faces, smooth surfaced thin metal slide plates covering said bottom faces and directly slidably engaging said bearing parts, depressed inner side horizontal extensions on said runners engaging beneath the feet of said frame end and supporting the latter a slight distance only above the floor and laterally inwardly of said runners and base members, and means to detachably rigidly clamp said runner extensions to said feet.

7. The invention as defined by claim 6, and wherein said bearing parts are prefabricated Teflon pads and said slide plates are thin walled preformed stainless steel shells adapted to engage frictionally upon said runners.

8. A vibration isolating support and machinery which tends to oscillate in a primary horizontal direction but with a tendency to shift a portion of its weight downwardly alternately near the front and back of the machinery, said support comprising units attached to pairs of supporting feet on said machinery at opposite ends thereof, each unit comprising a pair of separately formed low silhouette base members having substantially flat bottom faces and slightly elevated longitudinally arcuate convex upper faces which slope in opposite directions and the top of whose arcs terminate on a horizontal plane common to the base members, the radii of said arcs being spaced apart longitudinally of the unit, thin low friction bearing elements on the upper faces of the base members conforming to the curvature thereof, separately formed runners overlying the base members and attached directly to the feet in spaced relation and having bottom bearing faces adapted to slidably engage said bearing elements, said bottom bearing faces conforming in shape to and interfitting with the arcuate convex upper faces of the base members, said base members and runners lying laterally outwardly of said feet, a downwardly offset substantially horizontal extension on the inner side of each runner underlying and engaging one of said feet, and means to positively clamp said horizontal extension to the foot resting upon it.

9. A vibration isolating support and machinery which tends to oscillate in a primary horizontal direction but with a tendency to shift a portion of its weight downwardly alternately near the front and back of the machinery, said support comprising units attached to pairs of supporting feet on said machinery at opposite ends thereof, each unit comprising a pair of separately formed low silhouette base members substantially directly beneath the feet and having substantially flat bottom faces and slightly elevated longitudinally arcuate convex upper faces which slope in opposite directions and the tops of whose arcs terminate on a horizontal plane common to the base members, the radii of said arcs spaced apart longitudinally of the unit, thin low friction bearing elements on the upper faces of the base members and conforming to the curvature thereof separately formed runners overlying the base members and detachably rigidly secured to said feet in spaced relation and having bottom bearing faces adapted to slidably engage said bearing elements, said bottom bearing faces conforming in shape to and interfitting with the arcuate convex upper faces of the base members, and a single adjustable resilient unloading unit associated with one of said support units and engaging and tending to lift one side of said machinery to equalize the machinery weight distribution on said feet, said machinery tending to have its center of gravity offset toward one side.

10. The invention as defined by claim 9, and wherein said adjustable resilient unloading unit includes an upper clamp part for connection with a machinery frame part, a floor-engaging block, an upstanding screw-threaded element having swiveled engagement with the block, a screw-threaded adjusting element on the aforementioned screw-threaded element, and a compression spring engaging the adjusting element and said upper clamp part.

11. A loom supporting and vibration isolating means comprising in combination front and back vertically narrow floor-engaging base members each having upper faces which are longitudinally curved and inclined to correspond to the natural path through which the loom tends to oscillate under the influence of vibration forces, said base members tapering in opposite directions forwardly and rearwardly, means adjustably interconnecting the base members in longitudinally spaced relation near a pair of loom feet, low friction substantially self-lubricating bearing parts on the upper faces of said base members, and a separately formed pair of runners directly attachable to said loom feet and overlying the base members and having bottom bearing faces curved and inclined to interfit with said upper faces and bearing parts and slidably engaging the bearing parts, whereby the entire loom may oscillate back-and-forth on said base members substantially in a natural arc of movement dictated by said vibration forces.

12. A vibration isolating and supporting unit for a loom frame end having spaced front and back horizontal feet, said unit comprising a pair of separately formed vertically narrow runners adapted to be rigidly attached to said feet so as to be capable of bearing the weight on said feet, said runners having bottom bearing faces which are concave and which curve longitudinally on arcs having spaced radii, the tops of said arcs blending into a common horizontal plane, said bearing faces sloping downwardly longitudinally in opposite directions from the tops of said arcs, coacting separately formed base members underlying said runners and having top convex bearing faces formed on substantially the same said arcs and sloping downwardly longitudinally in opposite directions and slidably engaging the runners and bearing the weight thereof and thereon, and means adjustably interconnecting the base members horizontally so that the spacing between the base members may be varied.

13. A loom supporting and vibration isolating unit comprising a low silhouette base device including end base members having upper longitudinally convex oppositely outwardly tapering bearing faces, integral bearing portions molded upon and with the base members from relatively hard plastic material having a multitude of Teflon fibers dispersed therethrough with at least some of said fibers exposed adjacent the bearing portions, metallic friction heat dissipating separately formed runners overlying the base members and having smooth bottom bearing faces slidably contacting said bearing portions and conforming substantially to the contours of the bearing portions, and means for detachably securing said runners individually to loom feet.

14. In a loom, a frame end having feet, runners secured to the bottoms of said feet and having longitudinally curved lower bearing faces which slope downwardly and outwardly in opposite directions, complementally-shaped base members underlying said runners and bearing the weight of said frame end and runners and constructed and arranged so that the frame end and runners may oscillate back and forth upon the base members longitudinally during loom operation, and a resilient adjustable tension unloading unit arranged between the runners and base members and engaging said frame end and bearing a portion of the weight thereof to equalize the distribution of weight of said loom, said loom having a center of gravity located relatively near to said frame end.

15. The invention as defined by claim 14, and wherein said unloading unit comprises an upper clamp part connected with said frame end, a lower floor-engaging block, an upstanding screw-threaded element having swiveled engagement with said block, a screw-threaded adjusting element on the aforementioned screw-threaded element, and a compression spring interposed between the adjusting element and upper clamp part.

16. A vibration isolating support for looms comprising runners attachable rigidly to spaced loom feet and capable of bearing the weight on said feet, said runners having bottom bearing faces which are concave and which are longitudinally curved on individual arcs having spaced apart equal radii, the curved bearing faces sloping downwardly longitudinally and outwardly in opposite directions from the tops of said arcs, the tops of said arcs being tangent to a common level plane extending between the center of said spaced apart radii, and base members underlying said runners and having top convex bearing faces formed on substantially the same said arcs and slidably engaging the runners and supporting the same, whereby movement of the loom on said base members in either direction produces an elevating of the loom center of gravity to limit the loom movement.

17. The invention as defined by claim 16, and means rigidly interconnecting the base members.

18. A vibration isolating and supporting unit for a loom frame end having spaced front and back horizontal feet, said unit comprising a pair of low silhouette runners attachable rigidly to said loom feet and capable of bearing the weight on said feet, said runners having bottom bearing faces which are concave and which curve longitudinally of the loom feet on separated arcs having spaced apart equal radii, said bearing faces sloping downwardly longitudinally in opposite directions from the tops of said arcs, the tops of said bearing faces and arcs being tangent to a common level plane extending between the centers of said spaced radii, and coacting base members underlying said runners and having top convex bearing faces formed on substantially the same said arcs and slidably engaging said runners and bearing the weight thereof and thereon.

References Cited by the Examiner

UNITED STATES PATENTS

| | | | |
|---|---|---|---|
| 2,680,259 | 6/1954 | Milk | 14—16 |
| 2,719,761 | 10/1955 | Bonnafe | 308—3 |
| 3,166,803 | 1/1965 | Ruckstuhl | 248—23 X |

CLAUDE A. LE ROY, *Primary Examiner.*

JOHN PETO, *Examiner.*